(12) United States Patent
Sung et al.

(10) Patent No.: US 10,311,999 B2
(45) Date of Patent: Jun. 4, 2019

(54) CABLE HAVING MULTIPURPOSE SPACE AREA

(71) Applicant: Thomas Engineering Co., LTD., Cheongju-si, Chungcheongbuk-do (KR)

(72) Inventors: Ho Churl Sung, Cheongju-si (KR); Moon Gyu Sung, Cheongju-si (KR)

(73) Assignees: Thomas Engineering Co., Ltd., Cheongju-si, Chungcheongbuk-do (KR); Ho Churl Sung, Cheongju-si, Chungcheongbuk-do (KR)

( * ) Notice: Subject to any disclaimer, the term of this patent is extended or adjusted under 35 U.S.C. 154(b) by 11 days.

(21) Appl. No.: 15/540,013

(22) PCT Filed: Nov. 9, 2016

(86) PCT No.: PCT/KR2016/012833
§ 371 (c)(1),
(2) Date: Jun. 26, 2017

(87) PCT Pub. No.: WO2017/146345
PCT Pub. Date: Aug. 31, 2017

(65) Prior Publication Data
US 2018/0047480 A1    Feb. 15, 2018

(30) Foreign Application Priority Data
Feb. 23, 2016  (KR) ........................ 10-2016-0021015

(51) Int. Cl.
*H01R 4/00*     (2006.01)
*H01B 7/18*     (2006.01)
(Continued)

(52) U.S. Cl.
CPC ............ *H01B 7/1815* (2013.01); *F16L 3/015* (2013.01); *H01B 7/17* (2013.01); *H02G 3/0487* (2013.01); *H02G 11/00* (2013.01); *F16G 13/16* (2013.01)

(58) Field of Classification Search
CPC .... H01B 7/1815; H02G 3/0487; H02G 11/00; F16L 3/015; F16L 13/16
(Continued)

(56) References Cited

U.S. PATENT DOCUMENTS 3,816,818 A * 6/1974 Meier .................... H01R 4/245
                                                                  439/412
4,658,577 A * 4/1987 Klein ................... H02G 11/006
                                                                  248/49
(Continued)

FOREIGN PATENT DOCUMENTS

JP         2015109750 A  *  6/2015  ............. H02G 11/00
KR         2012-0085188     *  7/2012  ............... H02G 3/30
(Continued)

*Primary Examiner* — William H. Mayo, III
(74) *Attorney, Agent, or Firm* — Rabin & Berdo, P.C.

(57) ABSTRACT

A cable having a multipurpose space area comprises pods formed at both side ends of a cable and accommodating support members; electric cable insertion portions formed at the center of the cable between the pods and accommodating electric cables; support members inserted into the pods; and multiple electric cables inserted into the electric cable insertion portions. The electric cable insertion portion is partitioned into a plurality of areas by a plurality of joining portions and fusion portions to which fusible materials fused by heat are applied are formed at inner sides of the respective areas of the electric cable insertion portion.

25 Claims, 13 Drawing Sheets

(51) Int. Cl.
*H01B 7/17* (2006.01)
*H02G 11/00* (2006.01)
*F16L 3/015* (2006.01)
*H02G 3/04* (2006.01)
*F16G 13/16* (2006.01)

(58) Field of Classification Search
USPC ............... 174/117 R, 117 F, 117 FF, 68.3
See application file for complete search history.

(56) References Cited

U.S. PATENT DOCUMENTS

| | | | |
|---|---|---|---|
| 6,194,664 B1* | 2/2001 | Zamora | H02G 11/00 174/117 F |
| 8,662,456 B2* | 3/2014 | Komiya | H02G 11/006 174/72 R |
| 9,083,159 B2* | 7/2015 | Takeuchi | H02G 3/0475 |
| 2004/0112625 A1* | 6/2004 | Sheikholeslami | F16G 13/16 174/68.1 |
| 2012/0228437 A1* | 9/2012 | Tatsuta | H02G 11/006 248/49 |
| 2013/0075128 A1* | 3/2013 | Kaihotsu | F16L 3/015 174/68.3 |
| 2014/0042280 A1* | 2/2014 | Takeuchi | H02G 3/0475 248/49 |
| 2016/0314871 A1* | 10/2016 | Tetsuka | F16G 13/18 |

FOREIGN PATENT DOCUMENTS

| | | | | |
|---|---|---|---|---|
| KR | 20120092061 A | * | 8/2012 | ............ B25J 19/00 |
| KR | 10-1585900 A | * | 1/2016 | ............ H01B 7/08 |

* cited by examiner

CABLE HAVING MULTIPURPOSE SPACE AREA

CROSS-REFERENCE TO RELATED APPLICATIONS

This application claims priority to and the benefit of Korean Patent Application No. 10-2016-0021015 filed in the Korean Intellectual Property Office on Feb. 23, 2016, the entire contents of which are incorporated herein by reference.

TECHNICAL FIELD

The present invention relates to a cable which is used for a machine tool, an electronic device, an industrial robot, a conveying machine, etc., and which performs power feeding, liquid feeding, air feeding, etc., to a moving machine or a movable part of the moving machine and particularly, to a cable including a multipurpose support member inserting space area which may facilitate bending and straight posture of an electric wire and enable a multipurpose support member to be inserted and used according to the need of a user.

BACKGROUND ART

When a power cable is connected to supply power to movable bodies including a machine tool, a civil machine, a conveying device, etc., or a hose is connected to provide oil pressure or air pressure, unreasonable twisting or tensile force is caused on the power cable or hose due to the movement of the movable body, and as a result, the power cable or the hose is damaged or an external appearance is cluttered.

In order to solve the problem, a protection guide device is used, which supports the cable or the hose and induces and guides the cable or the hose.

For example, in order to prevent twisting or distortion, a protection guide device is presented, which accommodates the power cable or hose therein to protect the power cable or hose and disposes multi-joint support members at both sides to assist maintaining a straight state or a bending state of the cable or hose, but it is a reality that a sufficient effect as desired is not yet obtained.

In a cable protecting and guiding device in the related art, since a flexible material configuring the support member is stainless steel or a leaf spring, a bending radius may not be maintained when the bending posture is shown, and the bending radius is increased, and as a result, the support member contacts an obstacle, etc. at a proximate position. Therefore, it is difficult to install the support member in a predetermined space. In particular, when a stainless steel material is used as the flexible material, there is a problem that fatigue breakage is caused by long-term use, and as a result, the support member is insulated and it is impossible to use the support member.

In addition, the flexible member constituting the support member is made of stainless steel or plate spring and since the stainless steel or the leaf spring cannot be easily cut and attached, when the length of the support member is changed to a long length, the support member needs to be changed to new another support member and the support member is wasted, and furthermore, twisted rigidity is low at the time of bending the support member, so that resonance is caused and the operation of the bending posture and the straight posture becomes unstable.

In addition, the cable in the related art has a problem in that there is a limit in implementing a cable to which a sufficient need of a user is reflected because only the electric wire and the multi-joint support member are inserted and used.

PRIOR ART DOCUMENT

Patent Document

Korean Patent Unexamined Publication No. 10-2012-0092061 (Aug. 20, 2012)

SUMMARY OF THE INVENTION

The present invention has been made in an effort to provide a cable having a multipurpose space area, which may facilitate bending and straight posture of an electric cable and prevent entanglement and twisting of the electric cable and variously select and arrange types of support members or facilitate arrangement of the electric cables as necessary.

An exemplary embodiment of the present invention provides a cable having a multipurpose space area according to the present invention including: pods which are formed at both side ends of the cable to be separated from each other by a predetermined distance; electric cable insertion portions formed at the center of the cable between the pods and accommodating electric cables; support members inserted into the pods; multiple electric cables inserted into the electric cable insertion portions; and a clamp including an upper clamp installed above the support members and having upper insertion grooves formed at both side ends thereof and a lower clamp installed below the support member and having lower insertion portions formed at of both side ends thereof, and the support members are inserted into the upper and lower insertion grooves and the upper clamp, the support members, and the lower clamp are screw-joined by a bolt consecutively penetrating the upper clamp, the support members, and the lower clamp.

Herein, an elastic pad is installed on at least one of the inner surface of the upper clamp and the inner surface of the lower clamp to press ends of the electric cables positioned between the upper clamp and the lower clamp.

In addition, the support member may be various support members according to an installation purpose of the cable of the present invention and needs of a user and may be, for example, a multijoint support member and an air hose providing hydraulic pressure or pneumatic pressure.

In addition, the electric insertion portion is separated and partitioned into multiple spaces through multiple joining portions and multiple electric cables are separated and inserted in the separated and partitioned spaces.

According to an exemplary embodiment of the present invention, a cable having a multipurpose space area according to the present invention, which is configured as above bends a support member inserted into a pod to take straight posture or bending posture to guide and support an electric cable wire inserted into an electric cable insertion portion to take the straight or bending posture.

Further, various types of multipurpose support members to which a purpose of a place where the cable is installed and needs of a user can be reflected can be inserted into the pod to increase multipurpose use efficiency of the cable.

In addition, a clamp and a multijoint support member are connected to each other with a bolt to strengthen joining force therebetween.

Moreover, upper sides and lower sides of the electric cable are pressed by an elastic pad to prevent the electric cable from being damaged and prevent the electric cable from being twisted.

DETAILED DESCRIPTION

Hereinafter, exemplary embodiments of the present invention of a cable having a multipurpose space area according to the present invention will be described in detail with reference to the accompanying drawings.

Figure 1:
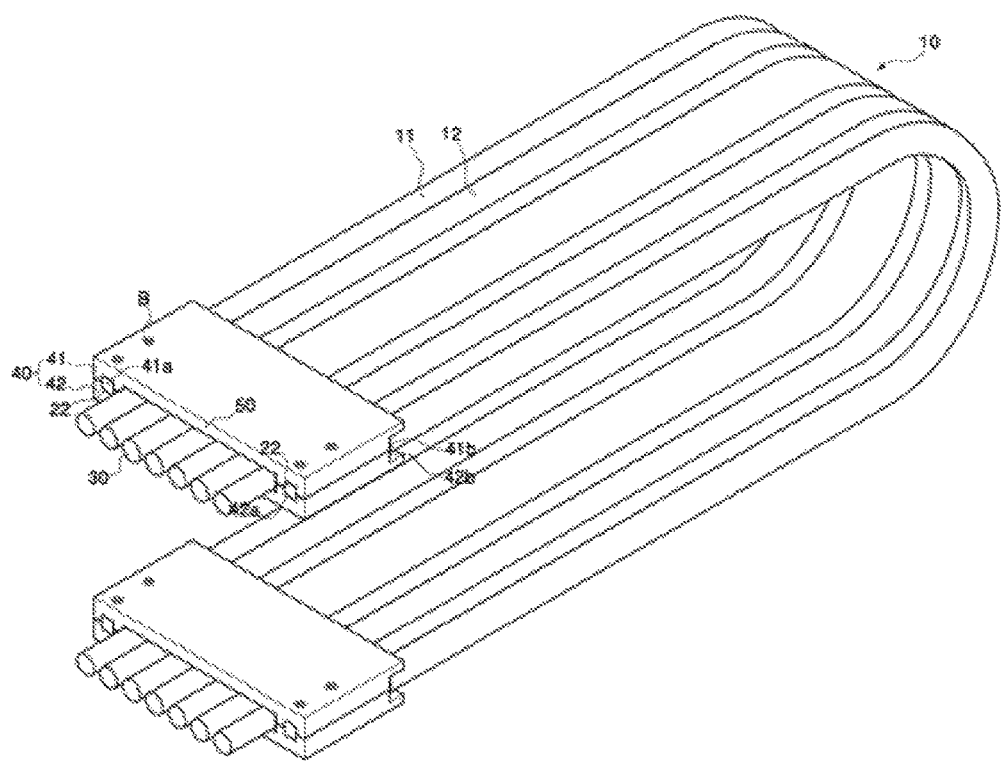
FIG. 1 is a perspective view of a cable having a multipurpose space area according to a first exemplary embodiment of the present invention.

FIG. 1 is a perspective view of a cable having a multipurpose space area according to a first exemplary embodiment of the present invention and FIG. 2 is an exploded perspective view of the cable having a multipurpose space area according to the first exemplary embodiment of the present invention.

As illustrated in FIGS. 1 and 2, a cable 10 having a multipurpose space area according to a first exemplary embodiment of the present invention includes a pod 11 accommodating a support member therein, an electric cable insertion portion 12 accommodating an electric cable therein, a support member 20 inserted into the pod 11, an electric cable 30 inserted into the electric cable insertion portion 12, and a clamp 40 fixed to the support member 20.

The pods 11 which are formed at both side ends of the cable to be separated from each other by a predetermined distance accommodate the support members therein and since the support member has a general chain shape or a similar shape to a pipe, an elongated empty space is formed in the pod 11. The pods 11 are formed at both side ends to be separated from each other by the predetermined distance.

Figure 2A:
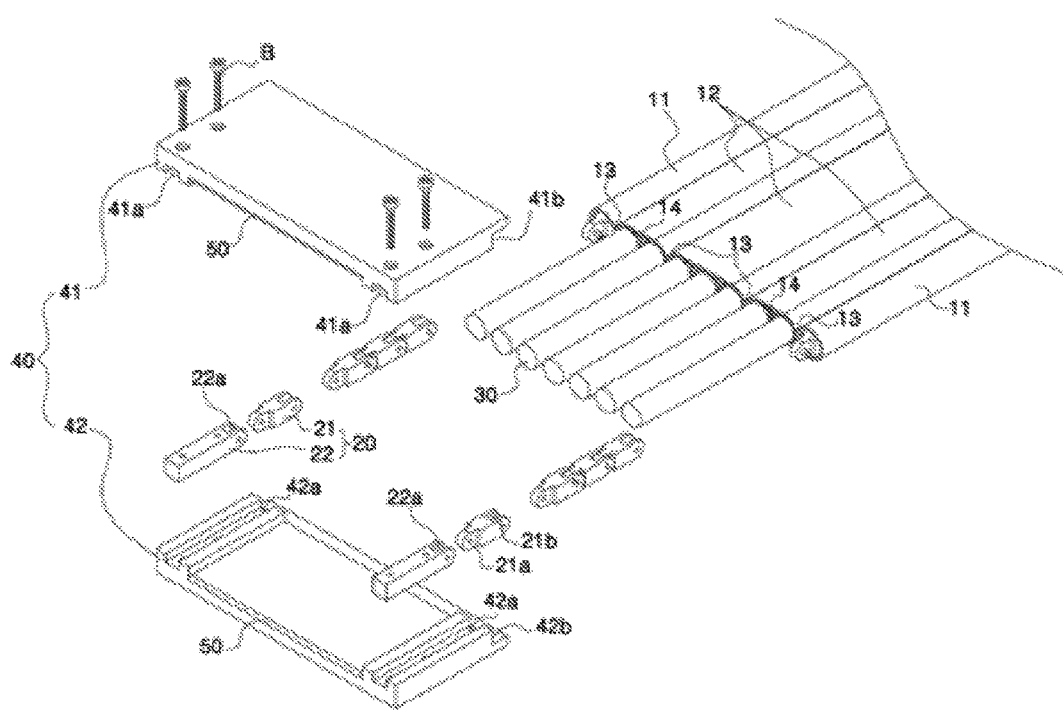
FIG. 2 is an exploded perspective view of the cable having a multipurpose space area according to the first exemplary embodiment of the present invention.
Figure 2B:
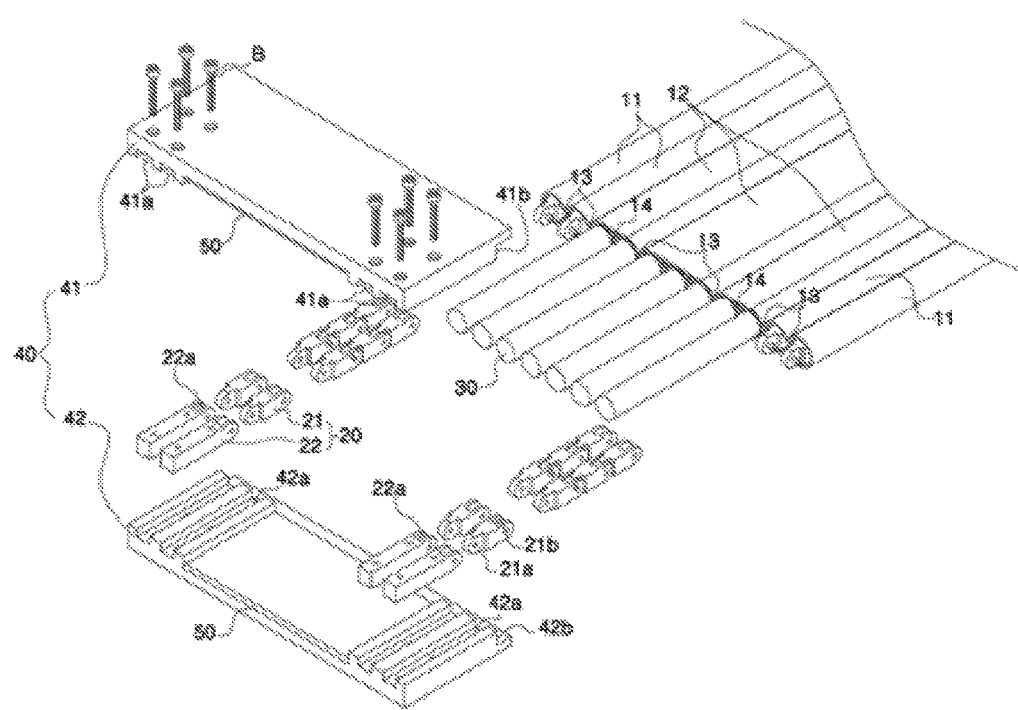

As illustrated in FIG. 2B, the pod 11 may be used while being partitioned into a plurality of areas by a joining portion 13. In FIG. 2B, an example in which the pod 11 is divided into two areas by the joining portion is illustrated, but it should be known that in the present invention, the pod 11 may be divided into more areas as necessary without being limited thereto.

The reason for partitioning the pod into the plurality of areas is that when a plurality of support members or support members (e.g., multijoint support members or air-hoses) having different characteristics are used in the pod forming one space, the pod may not show a normal function thereof due to entanglement or interference among the support members.

A plurality of electric cables is inserted into the electric cable insertion portion 12 and the electric cable insertion portion is partitioned into a plurality of areas by a plurality of joining portions 13. In this case, the number of the plurality of divided areas may be produced so that the electric cable insertion portion is partitioned according to the needs of a user while being manufactured.

Further, fusion portions 14 to which fusible materials fused by heat are applied are formed on inner sides of the respective areas of the electric cable insertion portion divided by the plurality of joining portions 13. The fusible material of the fusion portion 14 is melted by thermal fusion and fused onto the surface of the inserted electric cable and the surface of the inserted electric cable and the inner surfaces of the electric cable insertion portion are thus fused to each other at the time of manufacturing the cable, and as a result, even though the number of electric cables inserted into the electric cable insertion portion is two or more, mutual locations of the electric cables are changed and the electric cables are entangled or are disabled to move in the electric cable insertion portion.

The support member 20 is inserted into the pod 11. The support member 20 may be various types which may facilitate bending of the cable and taking a straight posture of the cable and according to a purpose by which the cable is used and the needs of the user and the support member 20 may be, for example, the multijoint support member, the air hose, and the like and is not limited thereto in the present invention.

However, in the first exemplary embodiment, the multijoint support member will be described as an example.

Figure 7:
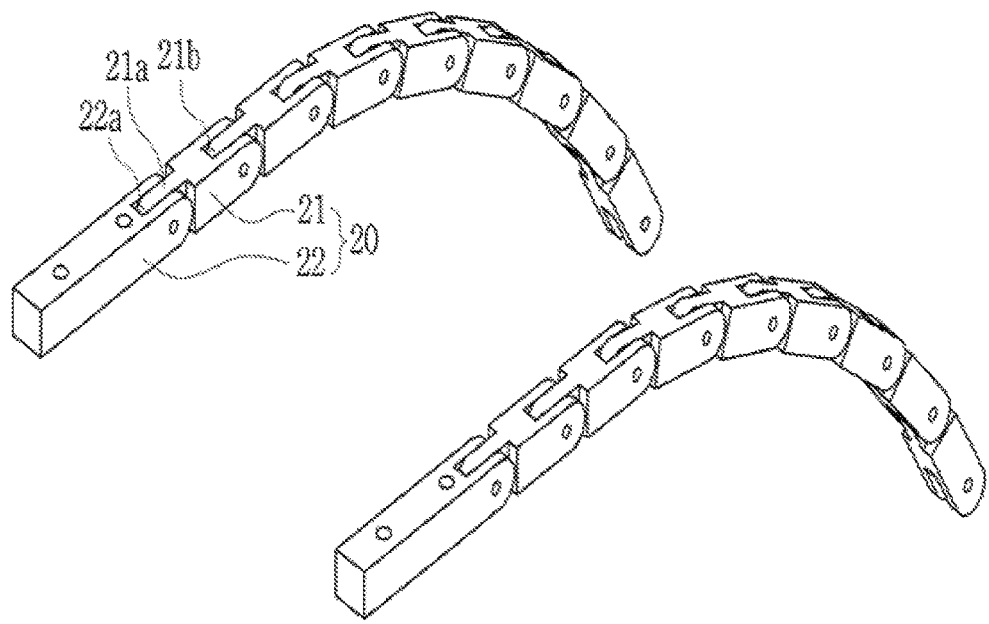
FIG. 7 is a perspective view of a multijoint support member according to the present invention.

As illustrated in FIG. 7, the multijoint support member includes multiple unit joints 21 and finishing joints 22 connected to the unit joints 21.

The unit joint 21 is inserted into the pad 11 and multiple unit joints 21 are connected to each other in line and each connection point is configured to pivot at a predetermined angle, and as a result, the unit joint 21 may have a smoothly rounded shape when the external force is applied to the unit joint 21.

In more detail, the unit joint 21 has an engagement protrusion 21a at the center of a front end thereof and an engagement groove 21b at the center of a rear end thereof. Therefore, when the unit joints 21 are connected to each other in line, the engagement protrusion 21a of the unit joint 21 positioned at a rear side engages in the engagement groove 21b of the unit joint 21 positioned at a front side and thereafter, is pierced by a pin. Therefore, the respective unit joints 21 pivot each other around the pin.

The finishing joint 22 which is connected to the unit joint 21 positioned at a frontmost side among the multiple unit joints 21 is inserted into an upper insertion groove 41a and a lower insertion groove 42a of the clamp 40.

In more detail, an engagement groove 22a is formed at the center of the rear end of the finishing joint 22, and as a result, the engagement protrusion 21a of the unit joint 21 positioned just behind the engagement groove 22a engages at the engagement groove 22a. In addition, the rear end of the finishing joint 22 and the engagement protrusion 21a of the unit joint 21 are pierced by the pin. As a result, the finishing joint 22 and the engagement protrusion 21a pivot around the pin.

Meanwhile, it is described that connection between the unit joint 21 and the unit joint 21 and connection between the unit joint 21 and the finishing joint 22 are described by a pin joining scheme, but the connection scheme is not particularly limited only to the pin joining scheme. That is, a small protrusion is formed on the side of the engagement protrusion 21a of the unit joint 21 and a hole is formed on the side of the engagement groove 21b of the unit joint 21 and the protrusion engages in the hole to allow the protrusions to pivot each other. In addition, the connection scheme between the unit joint 21 and the finishing joint 22 may also be the same as such a scheme.

The multiple electric cable 30 are inserted into the electric cable insertion portion 12, in more detail, the respective areas of the electric cable insertion portion partitioned into the plurality of areas by the joining portion. A fore end portion of the electric cable 30 is exposed to the outside of the electric cable insertion portion 12 to be positioned between upper and lower clamps 41 and 42.

The electric cable inserted into the electric cable insertion portion is thermally fused with the inner surface of the electric cable insertion portion by the thermal fusion at the time of manufacturing the cable by the fusible material applied to the fusion portion 14 formed on the inner surface of the electric cable insertion portion, and as a result, even though the plurality of electric cables is inserted, the electric cables are entangled with each other or are disabled to move.

As illustrated in FIGS. 2A and 2B, the clamp 40 includes the upper clamp 41 and the lower clamp 42 positioned below the upper clamp 41.

FIG. 2A illustrates a clamp structure when one support member is inserted into the pod 11 and FIG. 2B illustrates the clamp structure when a plurality of support members is inserted into the pod 11.

Referring to FIG. 2A, the clamp structure when one support member is inserted into the pod will be described.

As illustrated in FIG. 2A, the upper clamp 41 is installed above the support member 20, and upper insertion grooves 41a are formed at portions of both side ends of an inner surface of the upper clamp 41 in a longitudinal direction of the clamp and upper suspension projections 41b are formed at locations opposite to the pod at one end or both ends of the upper clamp 41.

The upper insertion groove 41a is a portion into which the support member 20 is inserted. In more detail, when the support member 20 is a multijoint support member, the upper insertion groove 41a is a portion into which an upper portion of the finishing joint 22 is inserted.

The upper suspension projection 41b prevents the pod 11 from further advancing forward to the inside of the clamp 40. That is, the upper suspension projection 41b serves as a means that prevents the end of the pod from being further pushed into the inside of the clamp.

The lower clamp 42 is installed below the support member 20, and lower insertion grooves 42a are formed at portions of both side ends of an inner surface of the upper clamp 42 in the longitudinal direction of the clamp and lower suspension projections 41b are formed at locations opposite to the pod at one end or both ends of the lower clamp 42.

The lower insertion groove 42a is a portion into which the support member 20 is inserted. In more detail, when the support member 20 is the multijoint support member 20, the lower insertion groove 41a is a portion into which a lower portion of the finishing joint 22 is inserted.

The lower suspension projection 42b prevents the pod 11 from further advancing forward to the inside of the clamp 40. That is, the lower suspension projection 42b serves as a means that prevents the end of the pod from being further pushed into the inside of the clamp together with the upper suspension projection 41b.

As described above, the support member 20 is inserted into a space formed by the upper insertion groove 41a and the lower insertion groove 42a and thereafter, joined to a bolt B. Additionally, the bolt B consecutively penetrates both side ends of the upper clamps 41a and both side ends of the finishing joint 22 of the support member 20 and the lower clamp 42 in the vertical direction to screw-join the upper clamp 41, and the finishing joint 22 of the multi-joint support member 20 and the lower clamp 42. As a result, the upper clamp 41, and the finishing joint 22 and the lower clamp 42 are firmly connected to each other.

Meanwhile, an elastic pad 50 is installed on at least one of the inner surface of the upper clamp 41 and the inner surface of the lower clamp 42.

A fore-end portion of the electric cable 30 exposed from the electric cable insertion portion 12 is positioned in a middle part of the inner surface of the clamp 40 and the elastic pad 50 made of a material such as silicon is installed on at least one of the middle part of the inner surface of the upper clamp 41 and the middle part of the inner surface of the lower clamp 42 to press an end portion of the electric cable 30. Therefore, when the electric cable 30 moves, the electric cable 30 may be prevented from being entangled.

Referring to FIG. 2B, the clamp structure when the plurality of support members is inserted into the pod will be described. In FIG. 2B, the number of the plurality of support members is two is illustrated as an example, but it should be known that a case where the number of the plurality of support members is three or more belongs to the present invention.

As illustrated in FIG. 2B, the upper clamp 41 is installed above the support member 20, and a plurality of upper insertion grooves 41a is formed at the portions of both side ends of the inner surface of the upper clamp 41 in the longitudinal direction of the clamp and the upper suspension projections 41b are formed at locations opposite to the pod at one end or both ends of the upper clamp 41.

The plurality of upper insertion grooves 41a are portions into which the plurality of support members 20 are inserted. In more detail, when the support member 20 is the multijoint support member, the upper insertion groove 41a is a portion into which the upper portion of the finishing joint 22 is inserted.

The upper suspension projection 41b prevents the pod 11 from further advancing forward to the inside of the clamp 40. That is, the upper suspension projection 41b serves as a means that prevents the end of the pod from being further pushed into the inside of the clamp.

The lower clamp 42 is installed below the support member 20, and a plurality of lower insertion grooves 42a are formed at portions of both side ends of an inner surface of the lower clamp 42 in the longitudinal direction of the clamp and lower suspension projections 41b are formed at locations opposite to the pod at one end or both ends of the lower clamp 42.

The plurality of lower insertion grooves 42a are portions into which the plurality of support members 20 are inserted. In more detail, when the support member 20 is the multijoint support member 20, the lower insertion groove 41a is a portion into which a lower portion of the finishing joint 22 is inserted.

The lower suspension projection 42b prevents the pod 11 from further advancing forward to the inside of the clamp 40. That is, the lower suspension projection 42b serves as a means that prevents the end of the pod from being further pushed into the inside of the clamp together with the upper suspension projection 41b.

As described above, the plurality of support members 20 are inserted into a plurality of spaces formed by the plurality of upper insertion grooves 41a and lower insertion grooves 42a and thereafter, joined to a plurality of bolts B. Additionally, the bolt B consecutively penetrates both side ends of the upper clamps 41a and both side ends of the finishing joint 22 of the support member 20 and the lower clamp 42 in the vertical direction to screw-join the upper clamp 41, and the finishing joint 22 of the multi-joint support member 20 and the lower clamp 42. As a result, the upper clamp 41, and the finishing joint 22 and the lower clamp 42 are firmly connected to each other.

Meanwhile, the elastic pad 50 is installed on at least one of the inner surface of the upper clamp 41 and the inner surface of the lower clamp 42.

The fore-end portion of the electric cable 30 exposed from the electric cable insertion portion 12 is positioned in the middle part of the inner surface of the clamp 40 and the elastic pad 50 made of the material such as the silicon is installed on at least one of the middle part of the inner surface of the upper clamp 41 and the middle part of the inner surface of the lower clamp 42 to press the end portion of the electric cable 30. Therefore, when the electric cable 30 moves, the electric cable 30 may be prevented from being entangled.

Figure 8:
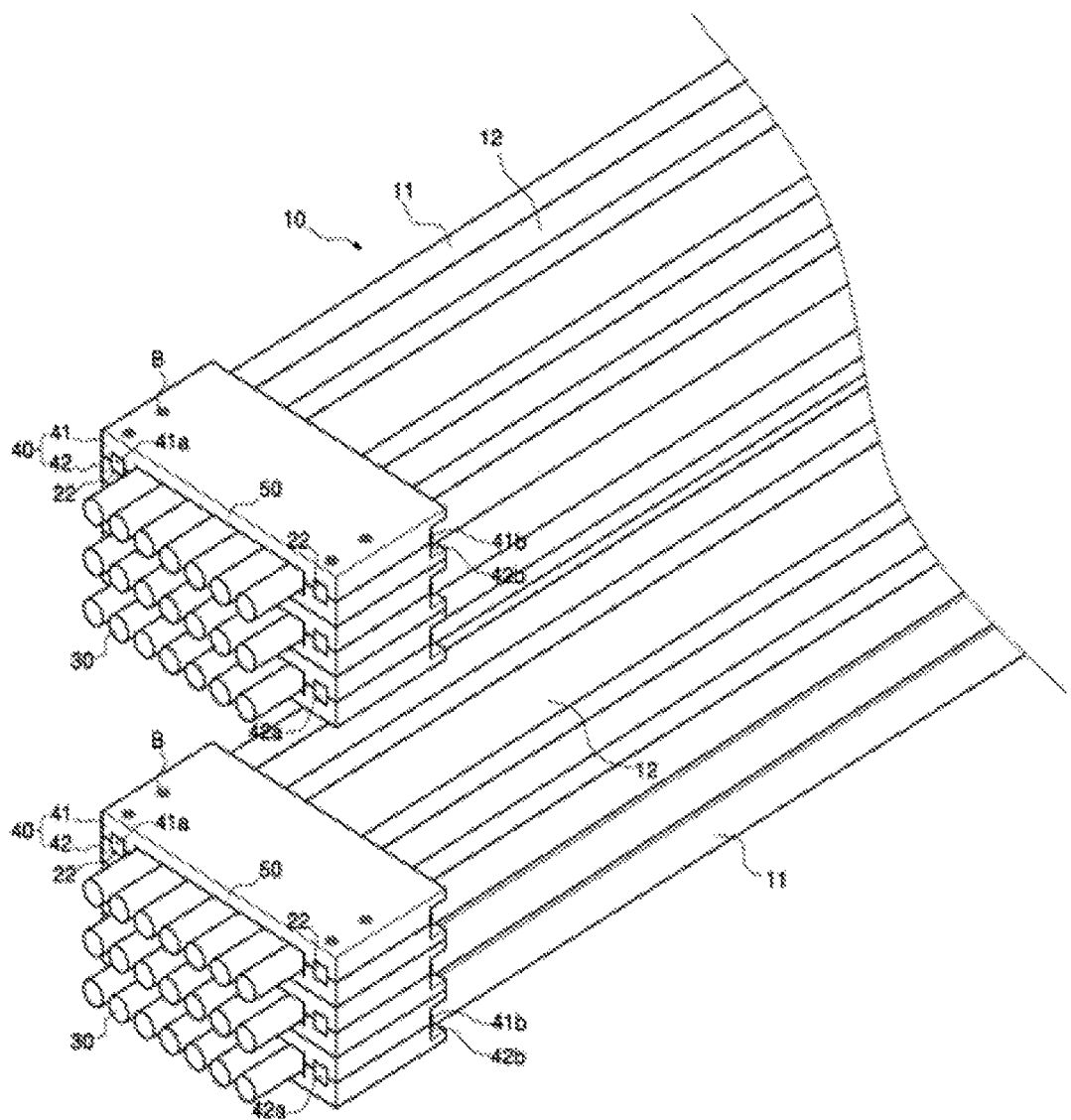
FIG. 8 is a perspective view of a cable having a multipurpose space area according to a fourth exemplary embodiment of the present invention.

Further, as illustrate din FIG. 8, the cable having the multipurpose may be formed in a plurality of stacking structures. Since the cables constituting each layer are stacked and joined by the bolts constituted in the clamp and other cables having the multipurpose space area forming each layer has the aforementioned structure, a detailed description will be omitted.

Figure 3:
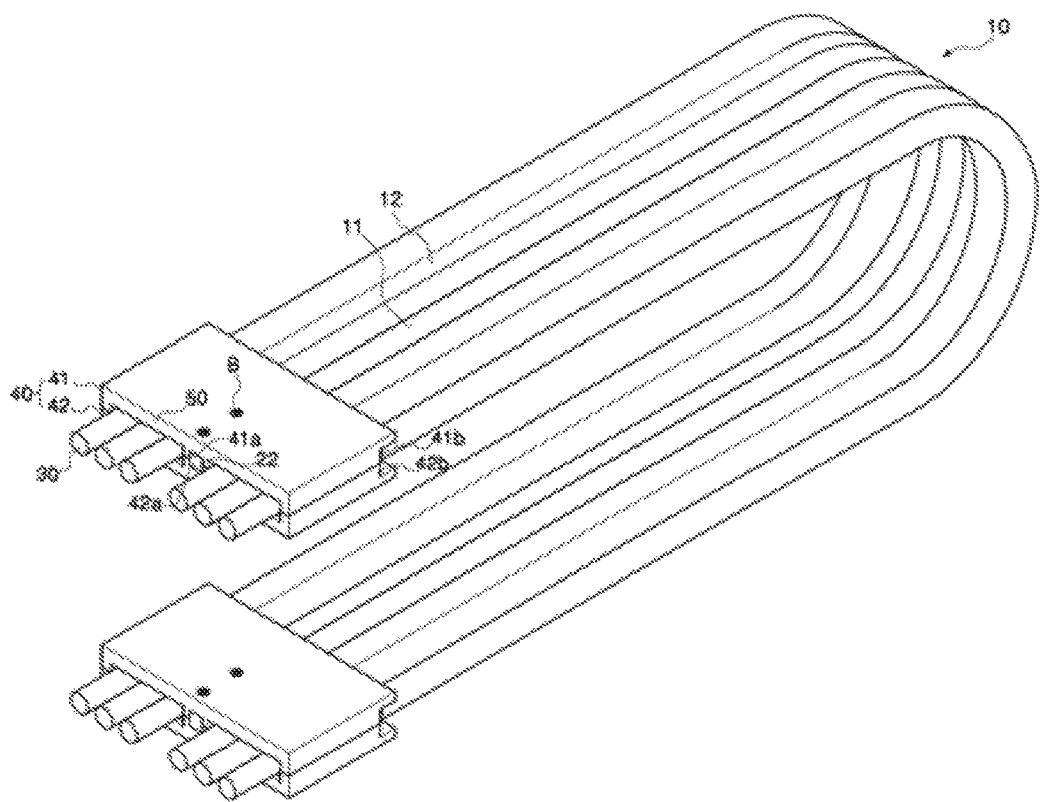
FIG. 3 is a perspective view of a cable having a multipurpose space area according to a second exemplary embodiment of the present invention.

FIG. 3 is a perspective view of a cable having a multipurpose space area according to a second exemplary embodiment of the present invention and FIG. 4 is an exploded perspective view of the cable having a multipurpose space area according to the second exemplary embodiment of the present invention.

As illustrated in FIGS. 3 and 4, a cable 10 having a multipurpose space area according to a second exemplary embodiment of the present invention includes a pod 11 formed at the center of the cable and accommodating a support member, electric cable insertion portion 12 formed at both sides of the pod 11 and accommodating an electric cable, a support member 20 inserted into the pod 11, multiple electric cables 30 inserted into the electric cable insertion portion 12, and a clamp 40 fixed to the support member 20.

The pod 11 is formed at the center of the cable 10 between the electric cable insertion portion 12 to accommodate the support member therein and since the support member has a general chain shape or a similar shape to a pipe, an elongated empty space is formed in the pod 11. The pod 11 is formed at the center of the cable 10 between the electric cable insertion portions 12.

Figure 4A:
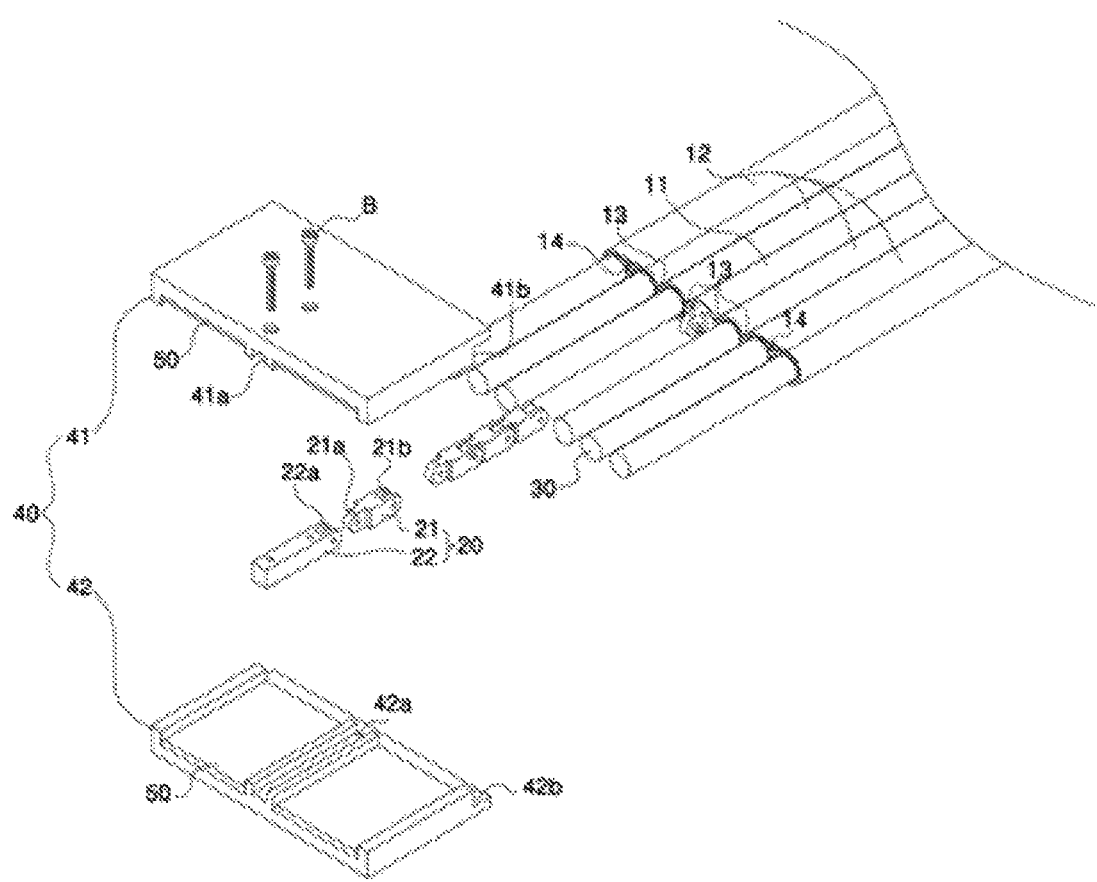
FIG. 4 is an exploded perspective view of the cable having a multipurpose space area according to the second exemplary embodiment of the present invention.
Figure 4B:
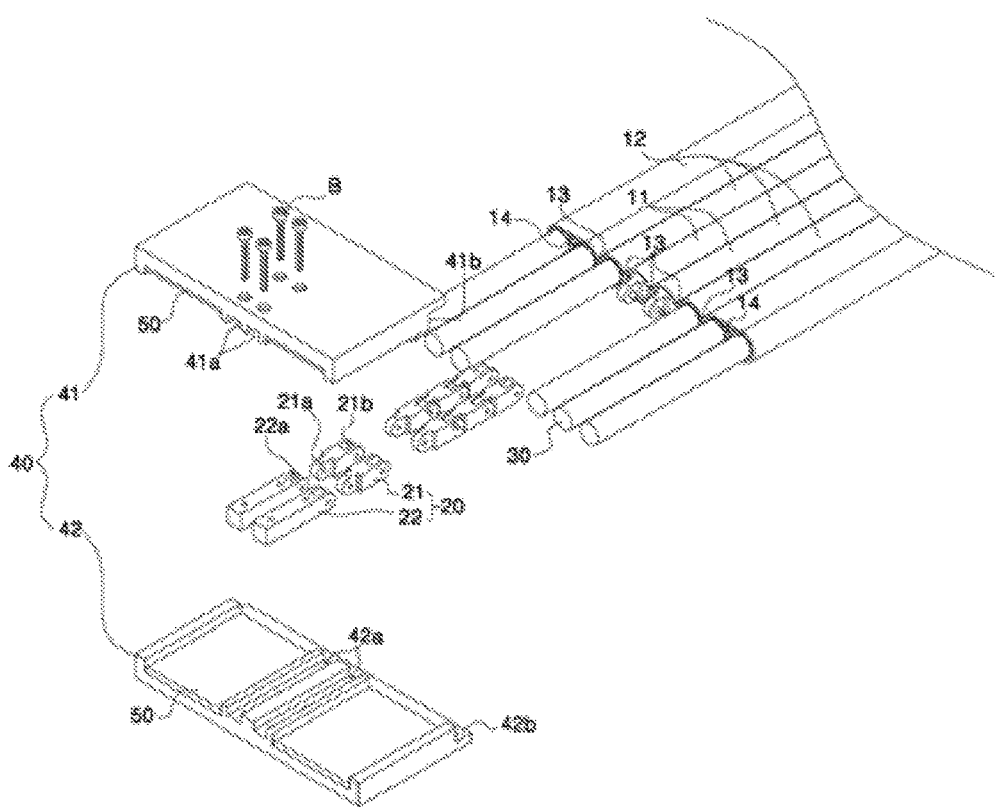

As illustrated in FIG. 4B, the pod 11 may be used while being partitioned into the plurality of areas by the joining portion 13. In FIG. 4B, an example in which the pod 11 is divided into two areas by the joining portion is illustrated, but it should be known that in the present invention, the pod 11 may be divided into more areas as necessary without being limited thereto.

The reason for partitioning the pod into the plurality of areas is that when a plurality of support members or support members (e.g., multijoint supporting members or air-hoses) having different characteristics are accommodated in the pod forming one space, the pod may not show a normal function thereof due to entanglement or interference among the supporting members.

A plurality of electric cables is inserted into the electric cable insertion portions 12 formed at both sides of the pod 11 and the electric cable insertion portion is partitioned into a plurality of areas by a plurality of joining portions 13. In this case, the number of the plurality of divided areas may be produced so that the electric cable insertion portion is partitioned according to the needs of a user while being manufactured.

Further, fusion portions 14 to which fusible materials fused by heat are applied are formed on inner sides of the respective areas of the electric cable insertion portion divided by the plurality of joining portions 13. The fusible material of the fusion portion 14 is melted by thermal fusion and fused onto the surface of the inserted electric cable and the surface of the inserted electric cable and the inner surfaces of the electric cable insertion portion are thus fused to each other at the time of manufacturing the cable, and as a result, even though the number of electric cables inserted into the electric cable insertion portion is two or more, mutual locations of the electric cables are changed and the electric cables are entangled or are disabled to move in the electric cable insertion portion.

The support member 20 is inserted into the pod 11. The support member 20 may be various types which may facilitate bending of the cable and taking a straight posture of the cable and according to a purpose by which the cable is used and the needs of the user and the support member 20 may be, for example, the multijoint support member, the air hose, and the like and is not limited thereto in the present invention.

Further, the number of inserted support members may be at least one and when the support members are multiple, the pod 11 may be partitioned into the plurality of areas by the joining portion 13 and the support members may be inserted into the respective divided areas as described above.

In the second exemplary embodiment, a case where the support member is one multijoint support member will be described as an example.

As illustrated in FIG. 7, the multijoint support member includes multiple unit joints 21 and finishing joints 22 connected to the unit joints 21.

The unit joint 21 is inserted into the pad 11 and multiple unit joints 21 are connected to each other in line and each connection point is configured to pivot at a predetermined angle, and as a result, the unit joint 21 may have a smoothly rounded shape when the external force is applied to the unit joint 21.

In more detail, the unit joint 21 has an engagement protrusion 21a at the center of a front end thereof and an engagement groove 21b at the center of a rear end thereof. Therefore, when the unit joints 21 are connected to each other in line, the engagement protrusion 21a of the unit joint 21 positioned at a rear side engages in the engagement groove 21b of the unit joint 21 positioned at a front side and thereafter, is pierced by a pin. Therefore, the respective unit joints 21 pivot each other around the pin.

The finishing joint 22 which is connected to the unit joint 21 positioned at a frontmost side among the multiple unit joints 21 is inserted into an upper insertion groove 41a and a lower insertion groove 42a of the clamp 40.

In more detail, an engagement groove 22a is formed at the center of the rear end of the finishing joint 22, and as a result, the engagement protrusion 21a of the unit joint 21 positioned just behind the engagement groove 22a engages at the engagement groove 22a. In addition, the rear end of the finishing joint 22 and the engagement protrusion 21a of the unit joint 21 are pierced by the pin. As a result, the finishing joint 22 and the engagement protrusion 21a pivot around the pin.

Meanwhile, it is described that connection between the unit joint 21 and the unit joint 21 and connection between the unit joint 21 and the finishing joint 22 are described by a pin joining scheme, but the connection is not particularly limited only to the pin joining scheme. That is, a small protrusion is formed on the side of the engagement protrusion 21a of the unit joint 21 and a hole is formed on the side of the engagement groove 21b of the unit joint 21 and the protrusion engages in the hole to allow the protrusions to pivot each other. In addition, the connection scheme between the unit joint 21 and the finishing joint 22 may also be the same as such a scheme.

The electric cables 30 are inserted into the electric cable insertion portion 12, in more detail, the respective areas of the electric cable insertion portion partitioned into the plurality of areas by the joining portion 13. The fore-end portion of the electric cable 30 is exposed to the outside of the electric cable insertion portion 12 to be positioned between upper and lower clamps 41 and 42.

The electric cable inserted into the electric cable insertion portion is thermally fused with the inner surface of the electric cable insertion portion by the thermal fusion at the time of manufacturing the cable by the fusible material applied to the fusion portion 14 formed on the inner surface of the electric cable insertion portion, and as a result, even though the plurality of electric cables is inserted, the electric cables are entangled with each other or are disabled to move.

As illustrated in FIGS. 4A and 4B, the clamp 40 includes the upper clamp 41 and the lower clamp 42 positioned below the upper clamp 41.

FIG. 4A illustrates a clamp structure when one support member is inserted into the pod 11 and FIG. 4B illustrates the clamp structure when a plurality of support members is inserted into the pod 11.

Referring to FIG. 4A, the clamp structure when one support member is inserted into the pod will be described.

As illustrated in FIG. 4A, the upper clamp 41 is installed above the support member 20, and upper insertion groove 41a are formed at the center of an inner surface of the upper clamp 41 at which the support member is to be positioned and upper suspension projections 41b are formed at locations opposite to the electric cable insertion portions 12 at one end or both ends of the upper clamp 41.

The upper insertion groove 41a is a portion into which the support member 20 is inserted. In more detail, when the support member 20 is the multijoint support member, the upper insertion groove 41a is a portion into which the upper portion of the finishing joint 22 is inserted.

The upper suspension projection 41b prevents the electric cable insertion portion 12 of the pod 10 from further advancing forward to the inside of the clamp 40. That is, the upper suspension projection 41b serves as a means that prevents the end of the electric cable insertion portion 12 from being further pushed into the inside of the clamp.

The lower clamp 42 is installed below the support member 20, and lower insertion grooves 42a are formed at the center of the inner surface of the lower clamp 42 at which the support member is to be positioned in the longitudinal direction of the clamp and lower suspension projections 42b are formed at locations opposite to the electric cable insertion portions 12 at one end or both ends of the lower clamp 42.

The lower insertion groove 42a is a portion into which the support member 20 is inserted. In more detail, when the support member 20 is the multijoint support member 20, the lower insertion groove 41a is a portion into which a lower portion of the finishing joint 22 is inserted.

The lower suspension projection 42b prevents the electric cable insertion portion 12 from further advancing forward to the inside of the clamp 40. That is, the lower suspension projection 42b serves as a means that prevents the end of the electric cable insertion portion from being further pushed into the inside of the clamp together with the upper suspension projection 41b.

As described above, the support member 20 is inserted into the upper insertion groove 41a and the lower insertion groove 42a and thereafter, joined to the bolt B. Additionally, the bolt B consecutively penetrates the centers of the upper clamps 41a and the centers of the finishing joint 22 of the support member 20 and the lower clamp 42 in the vertical direction to screw-join the upper clamp 41, and the finishing joint 22 of the multi-joint support member 20 and the lower clamp 42. As a result, the upper clamp 41, and the finishing joint 22 and the lower clamp 42 are firmly connected to each other.

Meanwhile, the elastic pad 50 is installed on at least one of the inner surface of the upper clamp 41 and the inner surface of the lower clamp 42.

In detail, the fore-end portions of the electric cable 30 exposed from the electric cable insertion portion 12 are positioned at both portions based on the middle part (a part where the support member is positioned) of the inner surface of the clamp 40 and the elastic pads 50 made of the material such as the silicon are installed at both portions based on the middle part (the part where the support member is positioned) of the inner surface of the upper clamp 41 and or at both parts or both sides based on the middle part (the part where the support member is positioned) of the inner surface of the lower clamp 41 to press the end portion of the electric cable 30. Therefore, when the electric cable 30 moves, the electric cable 30 may be prevented from being entangled.

Referring to FIG. 4B, the clamp structure when the plurality of support members is inserted into the pod will be described. In FIG. 4B, the number of the plurality of support members is two is illustrated as an example, but it should be known that a case where the number of the plurality of support members is three or more belongs to the present invention.

As illustrated in FIG. 4B, the upper clamp 41 is installed above the support member 20, and the plurality of upper insertion grooves 41a are formed at the center of an inner surface of the upper clamp 41 at which the support member is to be positioned and upper suspension projections 41b are formed at locations opposite to the electric cable insertion portions 12 at one end or both ends of the upper clamp 41.

The plurality of upper insertion grooves 41a are portions into which the plurality of support members 20 are inserted. In more detail, when the support member 20 is the multijoint support member, the upper insertion groove 41*a* is a portion into which the upper portion of the finishing joint 22 is inserted.

The upper suspension projection 41*b* prevents the electric cable insertion portion 12 from further advancing forward to the inside of the clamp 40. That is, the upper suspension projection 41*b* serves as a means that prevents the end of the electric cable insertion portion from being further pushed into the inside of the clamp.

The lower clamp 42 is installed below the support member 20, and a plurality of lower insertion grooves 42*a* are formed at the center of the inner surface of the lower clamp 42 at which the support member is to be positioned in the longitudinal direction of the clamp and lower suspension projections 42*b* are formed at locations opposite to the electric cable insertion portions 12 at one end or both ends of the lower clamp 42.

The plurality of lower insertion grooves 42*a* are portions into which the plurality of support members 20 are inserted. In more detail, when the support member 20 is the multijoint support member 20, the lower insertion groove 41*a* is a portion into which a lower portion of the finishing joint 22 is inserted.

The lower suspension projection 42*b* prevents the electric cable insertion portion 12 from further advancing forward to the inside of the clamp 40. That is, the lower suspension projection 42*b* serves as a means that prevents the end of the electric cable insertion portion from being further pushed into the inside of the clamp together with the upper suspension projection 41*b*.

As described above, the plurality of support members 20 are inserted into a plurality of spaces formed by the plurality of upper insertion grooves 41*a* and lower insertion grooves 42*a* and thereafter, joined by the plurality of bolts B. Additionally, the bolt B consecutively penetrates the centers of the upper clamps 41*a* and the centers of the finishing joint 22 of the support member 20 and the lower clamp 42 in the vertical direction to screw-join the upper clamp 41, and the finishing joint 22 of the multi-joint support member 20 and the lower clamp 42. As a result, the upper clamp 41, and the finishing joint 22 and the lower clamp 42 are firmly connected to each other.

Meanwhile, the elastic pad 50 is installed on at least one of the inner surface of the upper clamp 41 and the inner surface of the lower clamp 42.

In detail, the fore-end portions of the electric cable 30 exposed from the electric cable insertion portion 12 are positioned at both portions based on the middle part (a part where the support member is positioned) of the inner surface of the clamp 40 and the elastic pads 50 made of the material such as the silicon are installed at both portions based on the middle part (the part where the support member is positioned) of the inner surface of the upper clamp 41 and or at both parts or both sides based on the middle part (the part where the support member is positioned) of the inner surface of the lower clamp 41 to press the end portion of the electric cable 30. Therefore, when the electric cable 30 moves, the electric cable 30 may be prevented from being entangled.

Figure 9:
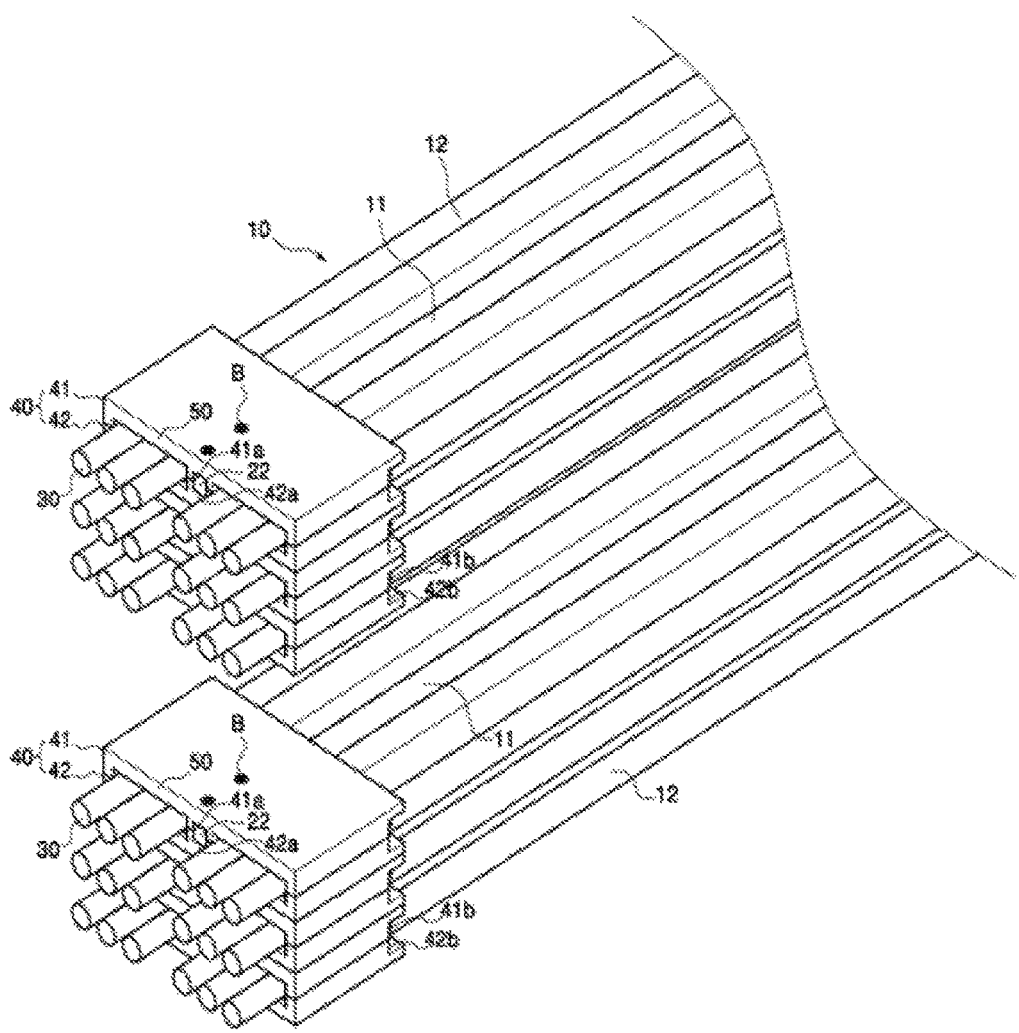
FIG. 9 is a perspective view of a cable having a multipurpose space area according to a fifth exemplary embodiment of the present invention.

Further, as illustrate din FIG. 9, the cable having the multipurpose may be formed in a plurality of stacking structures. Since the cables constituting each layer are stacked and joined by the bolts constituted in the clamp and other cables having the multipurpose space area forming each layer has the aforementioned structure, a detailed description will be omitted.

Figure 5:
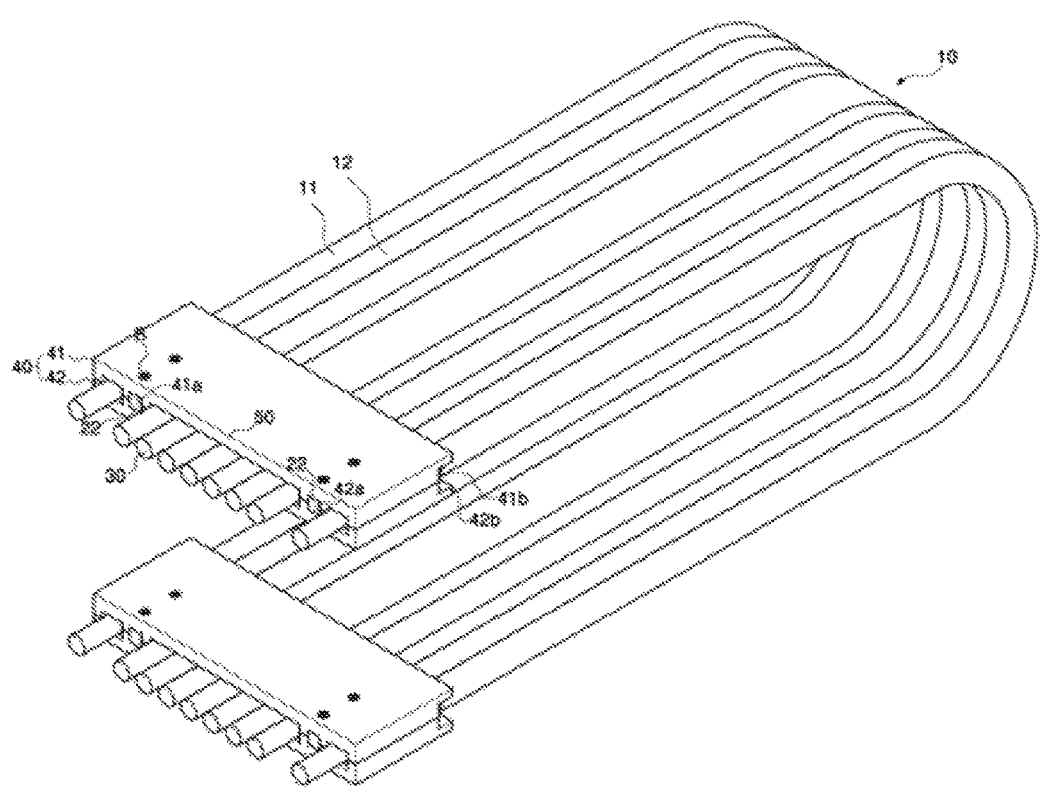
FIG. 5 is a perspective view of a cable having a multipurpose space area according to a third exemplary embodiment of the present invention.

FIG. 5 is a perspective view of a cable having a multipurpose space area according to a third exemplary embodiment of the present invention and FIG. 6 is an exploded perspective view of the cable having a multipurpose space area according to the third exemplary embodiment of the present invention.

As illustrated in FIGS. 5 and 6, a cable having a multipurpose space area according to a third exemplary embodiment of the present invention includes auxiliary electric cable insertion portions 15 formed at both side ends of the cable and accommodating an electric cable, pods 11 formed at side ends of the auxiliary electric cable insertion portions 15 and accommodating support members, electric cable insertion portions 12 formed at the center of the cable between the pods 11, support members 20 inserted into the pods 11, multiple electric cables 30 inserted into the electric cable insertion portions 12 and the auxiliary electric cable insertion portions 15, and a clamp 40 fixed to the support members 20.

The pod 11 is formed at each of ends (one end in an inward direction of the cable) of the auxiliary electric cable insertion portions 15 formed at both side ends of the cable to accommodate the support member therein and since the support member has a general chain shape or a similar shape to a pipe, an elongated empty space is formed in the pod 11. The pod 11 is formed between the electric cable insertion portion 12 and the auxiliary electric cable insertion portion 15.

Figure 6A:
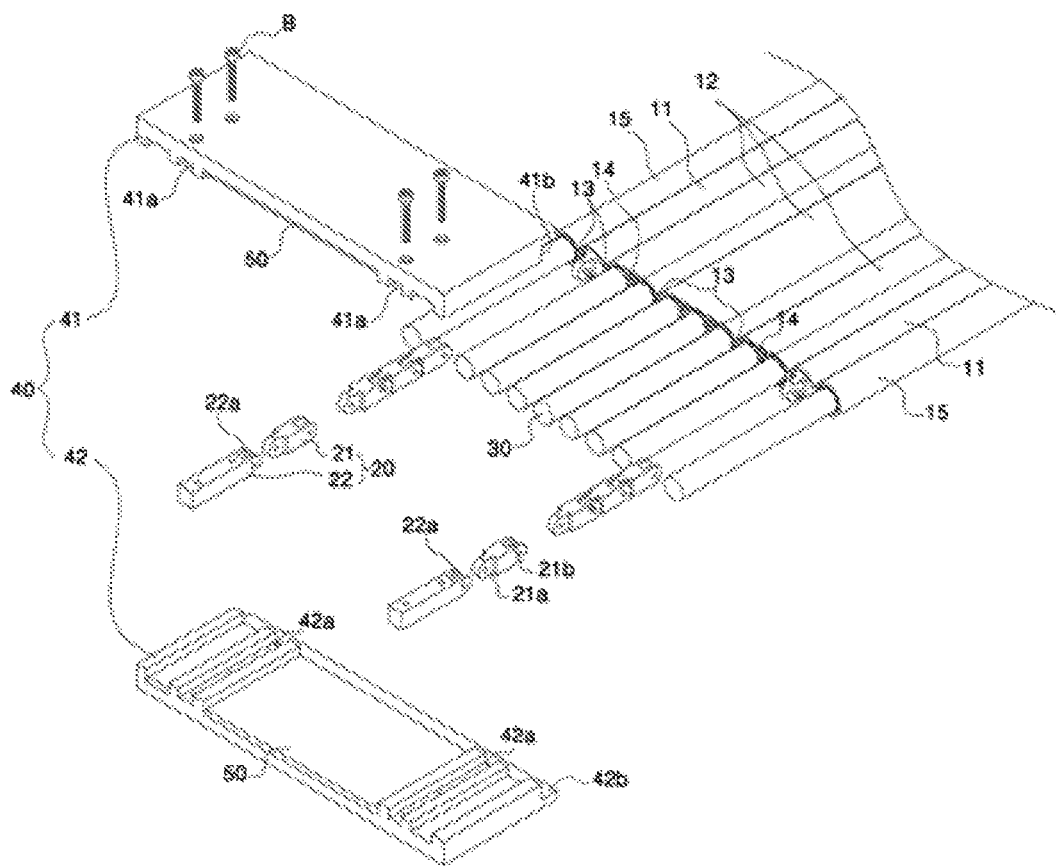
FIG. 6 is an exploded perspective view of the cable having a multipurpose space area according to the third exemplary embodiment of the present invention.
Figure 6B:
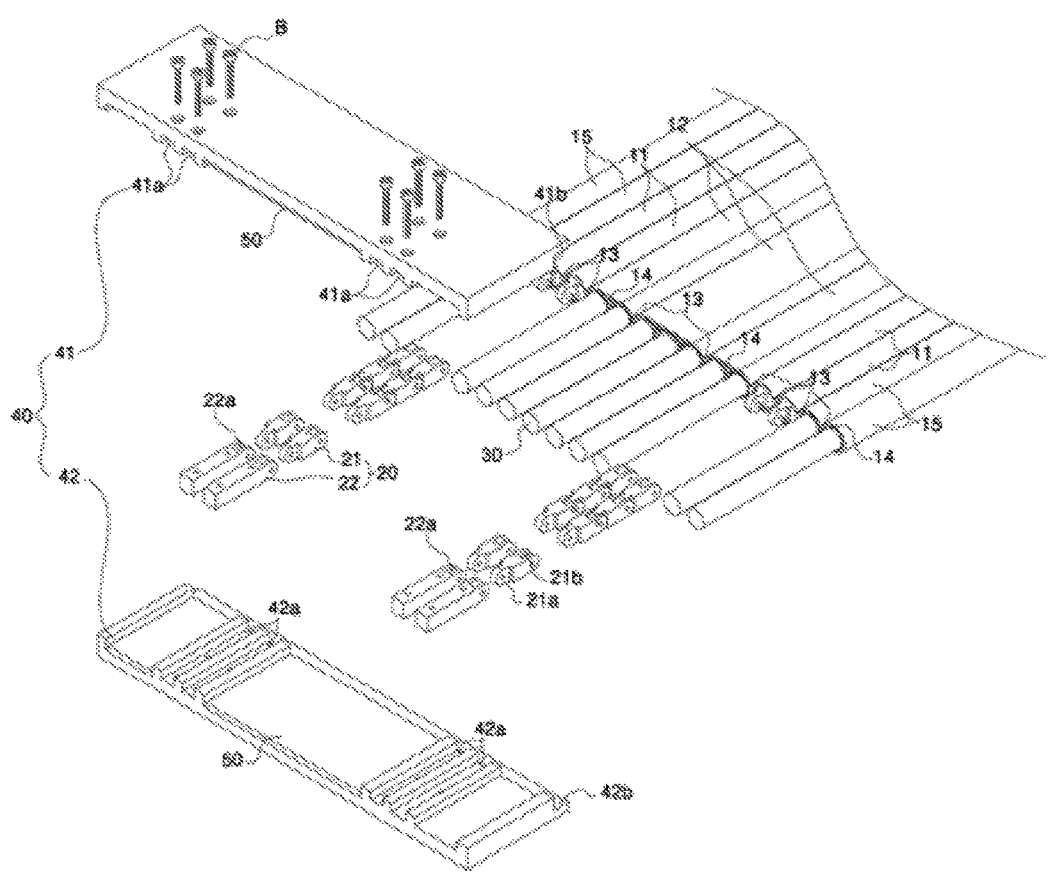

As illustrated in FIG. 6B, the pod 11 may be used while being partitioned into the plurality of areas by the joining portion 13. In FIG. 6B, an example in which the pod 11 is divided into two areas by the joining portion is illustrated, but it should be known that in the present invention, the pod 11 may be divided into more areas as necessary without being limited thereto.

The reason for partitioning the pod into the plurality of areas is that when a plurality of support members or support members (e.g., multijoint supporting members or air-hoses) having different characteristics are accommodated in the pod forming one space, the pod may not show a normal function thereof due to entanglement or interference among the supporting members.

A plurality of electric cables is inserted into the electric cable insertion portion 12 and the electric cable insertion portion is partitioned into a plurality of areas by a plurality of joining portions 13. In this case, the number of the plurality of divided areas may be produced so that the electric cable insertion portion is partitioned according to the needs of a user while being manufactured.

Further, fusion portions 14 to which fusible materials fused by heat are applied are formed on inner sides of the respective areas of the electric cable insertion portion divided by the plurality of joining portions 13. The fusible material of the fusion portion 14 is melted by thermal fusion and fused onto the surface of the inserted electric cable and the surface of the inserted electric cable and the inner surfaces of the electric cable insertion portion are thus fused to each other at the time of manufacturing the cable, and as a result, even though the number of electric cables inserted into the electric cable insertion portion is two or more, mutual locations of the electric cables are changed and the electric cables are entangled or are disabled to move in the electric cable insertion portion.

When insufficient electric cables are inserted into the electric cable insertion portion, auxiliary electric cables to be used as auxiliary electric cables are inserted into the auxiliary electric cable insertion portion 15.

The auxiliary electric cable insertion portion 15 may also be divided into the plurality of areas by the joining portion 13 similarly to the electric cable insertion portion and the fusion portion 14 to which the fusible material fused by heat is applied is formed inside the areas of the respective divided auxiliary electric cable insertion portions and the fusible portion 14 is melted by the thermal fusion and fused onto the surface of the inserted electric cables at the time of manufacturing the cable, and as a result, the surface of the inserted electric cable and the inner surface of the auxiliary electric cable insertion portion are fused to each other.

The support member 20 is inserted into the pod 11.

The support member 20 may be various types which may facilitate bending of the cable and taking a straight posture of the cable and according to a purpose by which the cable is used and the needs of the user and the support member 20 may be, for example, the multijoint support member, the air hose, and the like and is not limited thereto in the present invention.

However, in the third exemplary embodiment, the multijoint support member will be described as an example.

As illustrated in FIG. 7, the multijoint support member includes multiple unit joints 21 and finishing joints 22 connected to the unit joints 21.

The unit joint 21 is inserted into the pod 11 and multiple unit joints 21 are connected to each other in line and each connection point is configured to pivot at a predetermined angle, and as a result, the unit joint 21 may have a smoothly rounded shape when the external force is applied to the unit joint 21.

In more detail, the unit joint 21 has an engagement protrusion 21a at the center of a front end thereof and an engagement groove 21b at the center of a rear end thereof. Therefore, when the unit joints 21 are connected to each other in line, the engagement protrusion 21a of the unit joint 21 positioned at a rear side engages in the engagement groove 21b of the unit joint 21 positioned at a front side and thereafter, is pierced by a pin. Therefore, the respective unit joints 21 pivot each other around the pin.

The finishing joint 22 which is connected to the unit joint 21 positioned at a frontmost side among the multiple unit joints 21 is inserted into an upper insertion groove 41a and a lower insertion groove 42a of the clamp 40.

In more detail, an engagement groove 22a is formed at the center of the rear end of the finishing joint 22, and as a result, the engagement protrusion 21a of the unit joint 21 positioned just behind the engagement groove 22a engages in the engagement groove 22a. In addition, the rear end of the finishing joint 22 and the engagement protrusion 21a of the unit joint 21 are pierced by the pin. As a result, the finishing joint 22 and the engagement protrusion 21a pivot around the pin.

Meanwhile, it is described that connection between the unit joint 21 and the unit joint 21 and connection between the unit joint 21 and the finishing joint 22 are described by a pin joining scheme, but the connection is not particularly limited only to the pin joining scheme. That is, a small protrusion is formed on the side of the engagement protrusion 21a of the unit joint 21 and a hole is formed on the side of the engagement groove 21b of the unit joint 21 and the protrusion engages in the hole to allow the protrusions to pivot each other. In addition, the connection scheme between the unit joint 21 and the finishing joint 22 may also be the same as such a scheme.

The multiple electric cable 30 are inserted into the electric cable insertion portion 12, in more detail, the respective areas of the electric cable insertion portion partitioned into the plurality of areas by the joining portion. The fore-end portion of the electric cable 30 is exposed to the outside of the electric cable insertion portion 12 to be positioned between upper and lower clamps 41 and 42.

The electric cable inserted into the electric cable insertion portion 12 is thermally fused with the inner surface of the electric cable insertion portion by the thermal fusion at the time of manufacturing the cable by an adhesive material applied to the fusion portion 14 formed on the inner surface of the electric cable insertion portion, and as a result, even though the plurality of electric cables is inserted, the electric cables are entangled with each other or are disabled to move.

Further, the electric cables 30 are inserted even into the auxiliary electric cable insertion portions 15 formed at both side ends of the cable. When only the electric cables inserted into the electric cable insertion portions are insufficient, the electric cables inserted into the auxiliary electric cable insertion portions are inserted to be used as the auxiliary electric cables and the electric cables inserted into the auxiliary electric cable insertion portions 15 are thermally fused and joined onto the inner surface of the auxiliary electric cable insertion portions by the thermal fusion at the time of manufacturing the cable by the adhesive material applied to the fusion portion 14 formed on the inner surface of the auxiliary electric cable insertion portion.

As illustrated in FIGS. 6A and 6B, the clamp 40 includes the upper clamp 41 and the lower clamp 42 positioned below the upper clamp 41.

FIG. 6A illustrates a clamp structure when one support member is inserted into the pod 11 and FIG. 6B illustrates the clamp structure when a plurality of support members is inserted into the pod 11.

Referring to FIG. 6A, the clamp structure when one support member is inserted into the pod will be described.

As illustrated in FIG. 6A, the upper clamp 41 is installed above the support member 20, and upper insertion groove 41a are formed at portions of both ends of an inner surface of the upper clamp and upper suspension projections 41b are formed at one end or portions of both ends of the upper clamp 41.

The upper insertion groove 41a is a portion into which the support member 20 is inserted. In more detail, when the support member 20 is the multijoint support member, the upper insertion groove 41a is a portion into which the upper portion of the finishing joint 22 is inserted.

The upper suspension projection 41b prevents the auxiliary electric cable insertion portion 15 from further advancing forward to the inside of the clamp 40. That is, the upper suspension projection 41b serves as a means that prevents the end of the auxiliary electric cable insertion portion 15 from being further pushed into the inside of the clamp.

The lower clamp 42 is installed below the support member 20, and a plurality of lower insertion grooves 42a are formed at portions of both ends of the inner surface of the lower clamp 42 in the longitudinal direction of the clamp and lower suspension projections 42b are formed at locations of one end or both ends of the lower clamp 42.

The lower insertion groove 42a is a portion into which the support member 20 is inserted. In more detail, when the support member 20 is the multijoint support member 20, the lower insertion groove 41a is a portion into which a lower portion of the finishing joint 22 is inserted.

The lower suspension projection 42b prevents the auxiliary electric cable insertion portion 15 from further advancing forward to the inside of the clamp 40. That is, the lower suspension projection 42b serves as a means that prevents the end of the auxiliary electric cable insertion portion 15 from being further pushed into the inside of the clamp together with the upper suspension projection 41b.

As described above, the support member 20 is inserted into the upper insertion groove 41a and the lower insertion groove 42a and thereafter, joined to the bolt B. Additionally, the bolt B consecutively penetrates the upper clamps 41a and the finishing joint 22 of the support member 20 and the lower clamp 42 in the vertical direction to screw-join the upper clamp 41, and the finishing joint 22 of the support member 20 and the lower clamp 42. As a result, the upper clamp 41, and the finishing joint 22 and the lower clamp 42 are firmly connected to each other.

Meanwhile, the elastic pad 50 is installed on at least one of the inner surface of the upper clamp 41 and the inner surface of the lower clamp 42.

In detail, the fore-end portions of the electric cable 30 exposed from the electric cable insertion portion 12 and the auxiliary electric cable insertion portion 15 are positioned in the middle parts and at both side ends of the upper and lower clamps 41 and 42 and the elastic pad 50 made of the material such as the silicon is installed at both side ends of the middle part of the inner surface of the upper clamp 41 or in the middle part and both side ends or both the middle part and the both side ends of the inner surface of lower clamp 42 to press the end portion of the electric cable 30. Therefore, when the electric cable 30 moves, the electric cable 30 may be prevented from being entangled.

Referring to FIG. 6B, the clamp structure when the plurality of support members is inserted into the pod will be described. In FIG. 4B, the case where the number of the plurality of support members is two is illustrated as an example, but it should be known that a case where the number of the plurality of support members is three or more belongs to the present invention.

As illustrated in FIG. 6B, the upper clamp 41 is installed above the support member 20, and a plurality of upper insertion grooves 41a are formed at portions of both ends of an inner surface of the upper clamp and upper suspension projections 41b are formed at one end or portions of both ends of the upper clamp 41.

The plurality of upper insertion grooves 41a are portions into which the plurality of support members 20 are inserted. In more detail, when the support member 20 is the multijoint support member, the upper insertion groove 41a is a portion into which the upper portion of the finishing joint 22 is inserted.

The upper suspension projection 41b prevents the auxiliary electric cable insertion portion 15 from further advancing forward to the inside of the clamp 40. That is, the upper suspension projection 41b serves as a means that prevents the end of the auxiliary electric cable insertion portion 15 from being further pushed into the inside of the clamp.

The lower clamp 42 is installed below the support member 20, and a plurality of lower insertion grooves 42a are formed at portions of both ends of the inner surface of the lower clamp in the longitudinal direction of the clamp to correspond to the plurality of upper insertion grooves 41a and lower suspension projections 42b are formed at one end or both ends of the lower clamp 42.

The plurality of lower insertion grooves 42a are portions into which the plurality of support members 20 are inserted. In more detail, when the support member 20 is the multijoint support member 20, the lower insertion groove 41a is a portion into which a lower portion of the finishing joint 22 is inserted.

The lower suspension projection 42b prevents the auxiliary electric cable insertion portion 15 from further advancing forward to the inside of the clamp 40. That is, the lower suspension projection 42b serves as a means that prevents the end of the auxiliary electric cable insertion portion 15 from being further pushed into the inside of the clamp together with the upper suspension projection 41b.

As described above, the plurality of support members 20 are inserted into a plurality of spaces formed in the plurality of upper insertion grooves 41a and lower insertion grooves 42a and thereafter, joined to a plurality of bolts B. Additionally, the bolt B consecutively penetrates the upper clamps 41a and the finishing joint 22 of the support member 20 and the lower clamp 42 in the vertical direction to screw-join the upper clamp 41, and the finishing joint 22 of the support member 20 and the lower clamp 42. As a result, the upper clamp 41, and the finishing joint 22 and the lower clamp 42 are firmly connected to each other.

Meanwhile, the elastic pad 50 is installed on at least one of the inner surface of the upper clamp 41 and the inner surface of the lower clamp 42.

In detail, the fore-end portions of the electric cable 30 exposed from the electric cable insertion portion 12 and the auxiliary electric cable insertion portion 15 are positioned in the middle parts and at both side ends of the upper and lower clamps 41 and 42 and the elastic pad 50 made of the material such as the silicon is installed at both side ends of the middle part of the inner surface of the upper clamp 41 or in the middle part and both side ends or both the middle part and the both side ends of the inner surfaces of the upper and lower clamps 41 and 42 to press the end portion of the electric cable 30. Therefore, when the electric cable 30 moves, the electric cable 30 may be prevented from being entangled.

Figure 10:
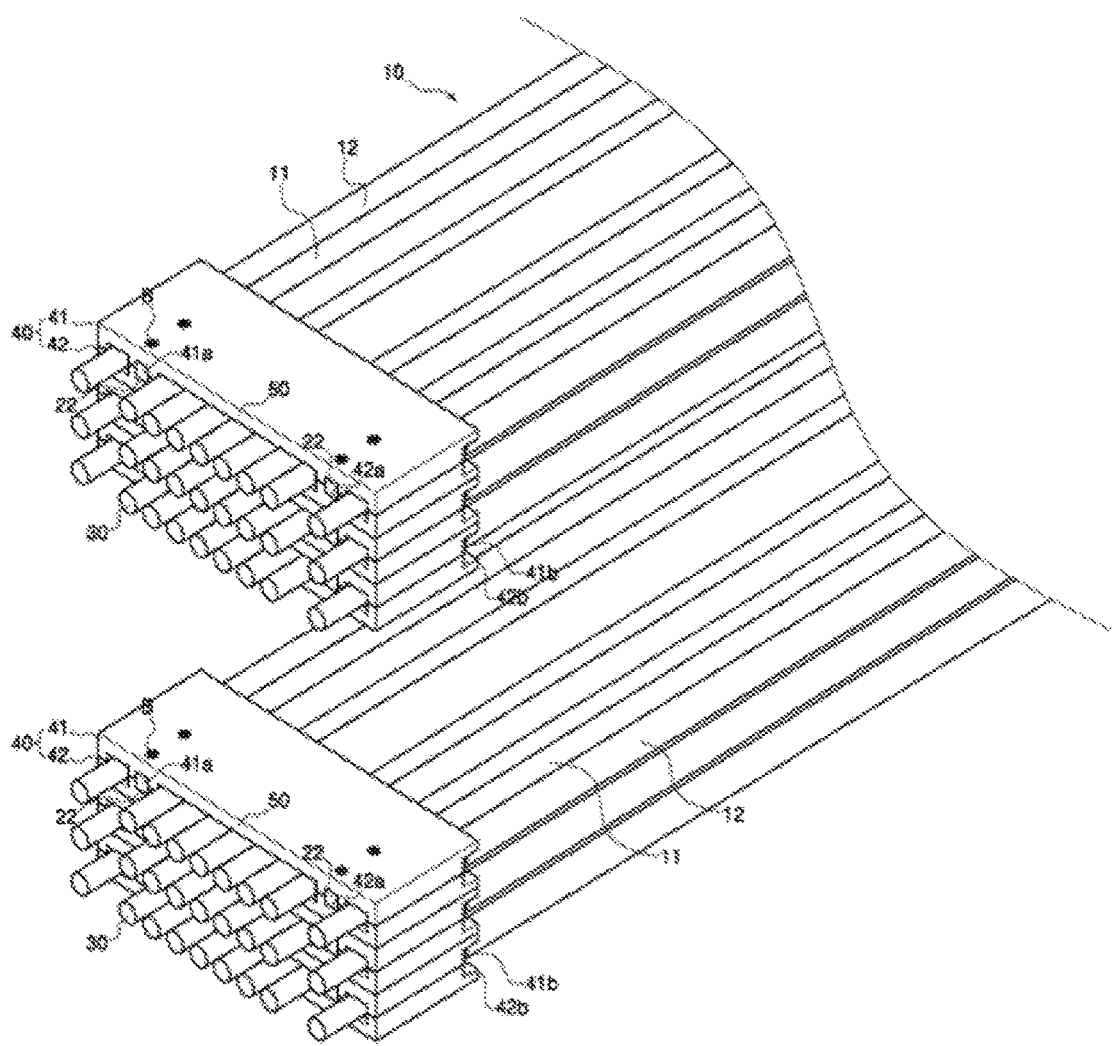
FIG. 10 is a perspective view of a cable having a multipurpose space area according to a sixth exemplary embodiment of the present invention.

Further, as illustrate din FIG. 10, the cable having the multipurpose may be formed in a plurality of stacking structures. Since the cables constituting each layer are stacked and joined by the bolts constituted in the clamp and other cables having the multipurpose space area forming each layer has the aforementioned structure, a detailed description will be omitted.

SEQUENCE LIST TEXT

10: Cable
11: Pod
12: Electric cable insertion portion
13: Joining portion
14: Fusion portion
15: Auxiliary electric cable insertion portion
20: Support member
30: Electric cable
40: Clamp
50: Elastic pad

What is claimed is:

1. A cable having a multipurpose space area, comprising:
pods formed at both side ends of a cable and accommodating support members;
electric cable insertion portions formed at the center of the cable between the pods and accommodating electric cables;
support members inserted into the pods, such that the pods and the support members extend along a length of the electric cable insertion portions; and
multiple electric cables inserted into the electric cable insertion portions, a first electric cable insertion portion among the electric cable insertion portions having at least two electric cables therein from among the multiple electric cables,
wherein the electric cable insertion portion is partitioned into a plurality of areas by a plurality of joining portions, each of the plurality of areas having a joining portion at opposite ends, the joining portions separating the plurality of areas from each other, and wherein the first electric cable insertion portion includes a fusion portion between each of the at least two electric cables, on an inner side of the at least two electric cables, the inner side being on an opposite side of the at least two electric cables from the joining portions of the first electric cable insertion portion, the fusion portion comprising fusible materials fused by heat.

2. The cable having a multipurpose space area of claim 1, further comprising:

a clamp, wherein the clamp includes an upper clamp in which upper insertion grooves installed above the support members and having upper insertion grooves formed at portions of both side ends of inner surfaces thereof in a longitudinal direction of the clamp and upper suspension projections formed at locations opposite to the pod at an end of one end or the pods at both ends and a lower clamp installed below the support member and having lower insertion portions formed at portions of both side ends of the inner surfaces thereof in the longitudinal direction of the clamp and lower suspension projections formed at locations opposite to the pod at an end of one end or the pods at both ends, and the support members are inserted into the upper and lower insertion grooves and the upper clamp, the support members, and the lower clamp are screw-joined by a bolt consecutively penetrating the upper clamp, the support members, and the lower clamp.

3. The cable having a multipurpose space area of claim 2, wherein an elastic pad is installed on at least one of the inner surface of the upper clamp and the inner surface of the lower clamp to press ends of the electric cables positioned between the upper clamp and the lower clamp.

4. The cable having a multipurpose space area of claim 2, wherein the support member is any one of a multijoint support member and an air hose.

5. The cable having a multipurpose space area of claim 4, wherein when the support member is the multijoint support member, the support member includes multiple unit joints inserted into the pod, and finishing joints connected to the unit joints and inserted into the upper insertion grooves and the lower insertion grooves and pierced by the bolt.

6. The cable having a multipurpose space area of claim 5, wherein in the unit joint, an engagement protrusion is formed at a fore-end and an engagement groove is formed at a rear end and the engagement protrusion of the unit joint positioned at a rear side engages in an engagement groove of the unit joint positioned at a front side and thereafter, pierced by a pin, and in the finishing joint, an engagement groove is formed at the rear end and the engagement protrusion of the unit joint positioned at the rear side engages in the engagement groove and is pierced by the bolt in a vertical direction.

7. A cable having a multipurpose space area, wherein the cable having a multipurpose space area of claim 2 is stacked in a plurality of stacking structures and cables constituting each layer are stacked and joined by a bolt configured in a clamp.

8. The cable having a multipurpose space area of claim 1, wherein the pod is partitioned into a plurality of areas by a plurality of joining portions and the support members are accommodated in the respective plurality of areas of the pod.

9. A cable having a multipurpose space area, comprising:

pods formed at both side ends of a cable and accommodating support members;

electric cable insertion portions formed at both sides of the pods and accommodating electric cables;

support members inserted into the pods, such that the pods and the support members extend along a length of the electric cable insertion portions; and multiple electric cables inserted into the electric cable insertion portions, a first electric cable insertion portion among the electric cable insertion portions having at least two electric cables therein from among the multiple electric cables, wherein the electric cable insertion portion is partitioned into a plurality of areas by a plurality of joining portions, each of the plurality of areas having a joining portion at opposite ends, the joining portions separating the plurality of areas from each other, and wherein the first electric cable insertion portion includes a fusion portion between each of the at least two electric cables, on an inner side of the at least two electric cables, the inner side being on an opposite side of the at least two electric cables from the joining portions of the first electric cable insertion portion, the fusion portion comprising fusible materials fused by heat.

10. The cable having a multipurpose space area of claim 9, further comprising:

the clamp, wherein the clamp includes an upper clamp in which upper insertion grooves installed above the support members and having upper insertion grooves formed at portions of the centers of the inner surfaces thereof in a longitudinal direction of the clamp and upper suspension projections formed at locations opposite to the pod at one end or the pods at both ends and a lower clamp installed below the support member and having lower insertion portions formed at portions of the centers of the inner surfaces thereof in the longitudinal direction of the clamp and lower suspension projections formed at locations opposite to the pod at one end or the pods at both ends, and the support members are inserted into the upper and lower insertion grooves and the upper clamp, the support members, and the lower clamp are screw-joined by a bolt consecutively penetrating the upper clamp, the support members, and the lower clamp.

11. The cable having a multipurpose space area of claim 10, wherein an elastic pad is installed on at least one of the inner surface of the upper clamp and the inner surface of the lower clamp to press ends of the electric cables positioned between the upper clamp and the lower clamp.

12. The cable having a multipurpose space area of claim 10, wherein the support member is any one of a multijoint support member and an air hose.

13. The cable having a multipurpose space area of claim 12, wherein when the support member is the multijoint support member, the support member includes multiple unit joints inserted into the pod, and finishing joints connected to the unit joints and inserted into the upper insertion grooves and the lower insertion grooves and pierced by the bolt.

14. The cable having a multipurpose space area of claim 13, wherein in the unit joint, an engagement protrusion is formed at a fore-end and an engagement groove is formed at a rear end and the engagement protrusion of the unit joint positioned at a rear side engages in an engagement groove of the unit joint positioned at a front side and thereafter, pierced by a pin, and
in the finishing joint, an engagement groove is formed at the rear end and the engagement protrusion of the unit joint positioned at the rear side engages in the engagement groove and is pierced by the bolt in a vertical direction.

15. A cable having a multipurpose space area, wherein the cable having a multipurpose space area of claim 10 is stacked in a plurality of stacking structures and cables constituting each layer are stacked and joined by a bolt configured in a clamp.

16. A cable having a multipurpose space area, comprising:
auxiliary electric cable insertion portions formed at both side ends of a cable, the auxiliary electric cable insertion portions accommodating first electric cables;
pods formed at side ends of the auxiliary electric cable insertion portions, the side ends accommodating support members;
electric cable insertion portions formed at the center of the cable between the pods, the electric cable insertion portions accommodating second electric cables;
support members inserted into the pods, such that the pods and the support members extend along a length of the electric cable insertion portions; and
multiple electric cables, including the first and second electric cables, inserted into the electric cable insertion portions and the auxiliary electric cable insertion portions, a first electric cable insertion portion among the electric cable insertion portions having at least two electric cables therein from among the multiple electric cables,
wherein the electric cable insertion portion is partitioned into a plurality of areas by a plurality of joining portions, each of the plurality of areas having a joining portion at opposite ends, the joining portions separating the plurality of areas from each other, and
wherein the first electric cable insertion portion includes a fusion portion between each of the at least two electric cables, on an inner side of the at least two electric cables, the inner side being on an opposite side of the at least two electric cables from the joining portions of the first electric cable insertion portion, the fusion portion comprising fusible materials fused by heat.

17. The cable having a multipurpose space area of claim 9, wherein the pod is partitioned into a plurality of areas by a plurality of joining portions and the support members are accommodated in the respective plurality of areas of the pod.

18. The cable having a multipurpose space area of claim 16, wherein the auxiliary electric cable insertion portion is partitioned into the plurality of areas by the plurality of joining portions, and
wherein at least one fusion portion is formed between two adjacent first electrical cables in one of the plurality of areas of the auxiliary electric cable insertion portion.

19. The cable having a multipurpose space area of claim 16, further comprising:
the clamp,
wherein the clamp includes an upper clamp in which upper insertion grooves installed above the support members and having upper insertion grooves formed at portions of both ends of the inner surfaces thereof in a longitudinal direction of the clamp and upper suspension projections formed at locations opposite to the pod at one end or the pods at both ends and a lower clamp installed below the support member and having lower insertion portions formed at portions of both ends of the inner surfaces thereof in the longitudinal direction of the clamp and lower suspension projections formed at locations opposite to the pod at an end or the pods at both ends, and
the support members are inserted into the upper and lower insertion grooves and the upper clamp, the support members, and the lower clamp are screw-joined by a bolt consecutively penetrating the upper clamp, the support members, and the lower clamp.

20. The cable having a multipurpose space area of claim 19, wherein an elastic pad is installed on at least one of the inner surface of the upper clamp and the inner surface of the lower clamp to press ends of the electric cables positioned between the upper clamp and the lower clamp.

21. The cable having a multipurpose space area of claim 19, wherein the support member is any one of a multijoint support member and an air hose.

22. The cable having a multipurpose space area of claim 21, wherein when the support member is the multijoint support member,
the support member includes multiple unit joints inserted into the pod, and
finishing joints connected to the unit joints and inserted into the upper insertion grooves and the lower insertion grooves and pierced by the bolt.

23. The cable having a multipurpose space area of claim 22, wherein in the unit joint, an engagement protrusion is formed at a fore-end and an engagement groove is formed at a rear end and the engagement protrusion of the unit joint positioned at a rear side engages in an engagement groove of the unit joint positioned at a front side and thereafter, pierced by a pin, and
in the finishing joint, an engagement groove is formed at the rear end and the engagement protrusion of the unit joint positioned at the rear side engages in the engagement groove and is pierced by the bolt in a vertical direction.

24. A cable having a multipurpose space area, wherein the cable having a multipurpose space area of claim 19 is stacked in a plurality of stacking structures and cables constituting each layer are stacked and joined by a bolt configured in a clamp.

25. The cable having a multipurpose space area of claim 16, wherein the pod is partitioned into a plurality of areas by a plurality of joining portions and the support members are accommodated in the respective plurality of areas of the pod.

* * * * *